United States Patent
Faecke et al.

(10) Patent No.: US 6,891,012 B2
(45) Date of Patent: May 10, 2005

(54) POWDER COATINGS PRODUCED WITH CROSSLINKERS CAPABLE OF CURING AT LOW TEMPERATURES AND COATED ARTICLES PRODUCED THEREFROM

(75) Inventors: Thomas Faecke, Bridgeville, PA (US); Ramesh Subramanian, Coraopolis, PA (US); James W. Rawlins, Leverkusen (DE); Eric J. Vidra, Pittsburgh, PA (US)

(73) Assignee: Bayer Materialscience LLC, Pittsburgh, PA (US)

(*) Notice: Subject to any disclaimer, the term of this patent is extended or adjusted under 35 U.S.C. 154(b) by 6 days.

(21) Appl. No.: 10/444,579

(22) Filed: May 23, 2003

(65) Prior Publication Data
US 2004/0236021 A1 Nov. 25, 2004

(51) Int. Cl.$^7$ ............................................. C08G 18/80
(52) U.S. Cl. ............................ 528/45; 528/73; 525/123; 525/440; 525/453
(58) Field of Search ................... 528/45, 73; 525/123, 525/440, 453

(56) References Cited

U.S. PATENT DOCUMENTS

| | | | |
|---|---|---|---|
| 2,826,526 A | 3/1958 | Meyrick et al. | 154/139 |
| 5,621,063 A | 4/1997 | Wolf et al. | 528/45 |
| 5,852,203 A | 12/1998 | Jonsson et al. | 548/314.1 |
| 6,274,693 B1 | 8/2001 | Poth et al. | 528/45 |
| 6,296,903 B1 | 10/2001 | Sapper et al. | 427/195 |

FOREIGN PATENT DOCUMENTS

| | | | |
|---|---|---|---|
| DE | 3001060 | * | 7/1981 |
| DE | 197 31 392 | | 1/1999 |
| DE | 10150088 | * | 4/2003 |
| GB | 1 442 024 | | 7/1976 |
| JP | 63132980 | * | 6/1988 |

OTHER PUBLICATIONS

Progress in Organic Coating 43, (month unavailable) 2001, pp. 131–140, Douglas A. Wicks, Zeno W. Wicks Jr., "Multistep chemistry in thin films: the challenges of block isocyanates".

Ann., 562 (month unavailable) 1949, S. Peterson, pp. 205–229, "Niedermolekulare Umsetzungsprodukte aliphatischer Diisocyanate"—see abstract attached.

* cited by examiner

*Primary Examiner*—Rachel Gorr
(74) *Attorney, Agent, or Firm*—Joseph C. Gil; Lyndanne M. Whalen

(57) ABSTRACT

A solid isocyanate-based composition having a glass transition temperature of at least 30° C. is produced by at least partially blocking the isocyanate groups of a polyisocyanate with a compound corresponding to the specified Formula I. This blocked isocyanate composition is useful in the production of powder coatings which are capable of being cured at temperatures of from 80 to 220° C.

17 Claims, No Drawings

POWDER COATINGS PRODUCED WITH CROSSLINKERS CAPABLE OF CURING AT LOW TEMPERATURES AND COATED ARTICLES PRODUCED THEREFROM

BACKGROUND OF THE INVENTION

The present invention relates to solid, blocked polyisocyanate-based compositions which can be cured at temperatures of from about 80° C. to about 220° C. and are useful for the production of a powder-coated substrates, even heat sensitive substrates such as wood, sensitive metals or plastic.

Conventional powder coating systems for industrial applications are generally based on one of two different crosslinking chemistries. Acid functional resins are cured with epoxides or hydroxyalkylamides. Alcohol functional resins are usually cured with blocked isocyanates. Although there are many variations of these types of systems, they all have as a common characteristic the need for a temperature of at least 140° C. for effective curing. In many cases, even higher reaction temperatures (e.g., 160–200° C.) are used. These high curing temperatures limit usage of powder coatings to heat resistant substrates such as metal (e.g., metal cabinets, household appliances, bicycle frames, etc.)

Powder coatings have the advantages of extremely low emissions and virtually 100% utilization of the coating material when the overspray is recycled. Therefore, it would be advantageous to be able to apply powder coatings to heat sensitive substrates such as wood and plastic. Powder coatings which can be cured at lower temperatures would also dramatically reduce the energy cost and make these coatings even more economically attractive.

Adducts from isocyanates and dicarbonylmethanes are known for their low temperature reactivity cure. (See, for example, S. Petersen Ann 562, p. 205 (1949).) Among the commonly used dicarbonylmethanes are diethylmalonate, ethylacetylacetate and acetylacetone. U.S. Pat. No. 2,826,526, for example, teaches the use of acetylacetic acid esters as blocking agents for isocyanates in adhesives. GB 1442024 teaches the blocking of biuret-based polyisocyanates with diethylmalonate for liquid coatings.

Dicarbonylmethane-blocked isocyanates react with alcohols at 80–120° C., depending on the specific reactants used. In comparison to all other blocked isocyanates, these blocked isocyanates offer the advantage of the lowest curing temperatures achieved within this chemistry. (See D. A. Wicks, Z. W. Wicks Jr., "Multistep Chemistry in Thin Films: The Challenge of Blocked Isocyanates", Prog. Org. Coat. 43 (2001) 131–140.)

Although dicarbonylmethane-blocked isocyanates are disclosed in many publications, to date these products have been used only as liquids in organic solvents for coatings and for adhesives. See, for example, DE 19 73 1392 which broadly discloses solid blocked norbornane diisocyanates and the use of diethyl malonate as a blocking agent. The only specific blocked diisocyanates taught in this disclosure are blocked with ε-caprolactam or triazole. No malonate-blocked materials are disclosed.

No dicarbonylmethane-blocked isocyanate products which satisfy the processing requirements of materials for powder coatings are known.

Any material used in the powder coatings must be a solid, grindable, friable material that remains a free flowing powder during storage. It must also be stable to blocking when formulated as a powder coating and should be processable in a standard powder coating process. A crosslinking agent which satisfies these requirements and which makes it possible to produce a powder coating that may be cured at temperatures below 150° C. would be commercially advantageous.

SUMMARY OF THE INVENTION

One object of the present invention is to provide a solid, friable and grindable crosslinker suitable for use in powder coatings.

It is another object of the present invention to provide a solid crosslinker which reacts with a compound having at least one alcohol group and cures at a temperature between 80–220° C.

It is a further object of the present invention to provide a powder coating which may be successfully applied to a substrate material that is heat sensitive.

It is an additional object of the present invention to provide a process for the production of a solid crosslinker for powder coatings in which no solvent is used thereby avoiding expensive and time-consuming distillation and/or purification procedures.

It is also an object of the present invention to provide a solid isocyanate-based composition in which the isocyanate groups are at least partially blocked with at least one compound corresponding to Formula I described more fully below.

These and other objects which will be apparent to those skilled in the art are accomplished by the blocked isocyanate-based compositions of the present invention produced in accordance with the procedure more fully described below.

DETAILED DESCRIPTION OF THE PREFERRED EMBODIMENTS OF THE INVENTION

The present invention relates to a new class of blocked isocyanate-based crosslinkers, to the synthesis of these crosslinkers and to their use in powder coatings. This new class of crosslinkers makes it possible to cure at significantly lower temperatures (i.e., temperatures in the range of 80–160° C.) than those currently being used in the industry for powder coatings. These crosslinkers are also suitable for use at the higher temperatures currently used in commercial processes. These new materials of the present invention are brittle organic glasses having a minimum glass transition temperature of 30° C. and the easy grindability, friability and processability needed for powder coating raw materials.

It has surprisingly been found that blocked isocyanate crosslinkers having these advantageous characteristics are obtained by reacting a) at least one polyisocyanate, preferably a polyisocyanate having an average functionality of from about 1.8 to about 5, more preferably from about 1.9 to about 3.0, most preferably about 2, b) a blocking agent component which includes (1) at least one blocking agent represented by the formula

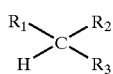

(I)

in which
R₁ represents hydrogen, an alkyl group (preferably having from 1 to 8 carbon atoms), an aryl group (preferably having from 5 to 16 carbon atoms), halogen or an allyl group,
R₂ represents CO—O-alkyl (the alkyl group preferably having from 1 to 8 carbon atoms), CO—O-aryl (the aryl group preferably having from 5 to 16 carbon atoms), CO—O-alkoxyalkyl (the alkoxyalkyl group preferably having from 2 to 16 carbon atoms), CO—O-arylalkyl (the arylalkyl group preferably having from 2 to 16 carbon atoms), CO-alkyl (the alkyl group preferably having from 1 to 8 carbon atoms), CO-aryl (the aryl group preferably having from 5 to 16 carbon atoms), CO-alkoxyalkyl (the alkoxyalkyl group preferably having from 2 to 16 carbon atoms), CO-arylalkyl (the arylalkyl group preferably having from 2 to 16 carbon atoms), cyanide, Si(CH₃)₃, or Si(C₂H₅)₃, and
R₃ represents the same group as R₂ or a different CO—O-alkyl, CO—O-aryl, CO—O-alkoxyalkyl, CO-arylalkyl, CO-alkyl, CO-aryl, CO-alkoxyalkyl, CO-arylalkyl, cyanide, Si(CH₃)₃ or Si(C₂H₅)₃ group, or
R₂ and R₃ together represent a cyclic ketone and/or ester group, and, optionally,
  (2) one or more other known blocking agents which are not represented by Formula I, and
c) an isocyanate-reactive component, preferably an isocyanate-reactive component which includes at least one compound having from about 1.3 to about 5 isocyanate-reactive groups, more preferably from about 1.9 to about 3 isocyanate-reactive groups, most preferably approximately 2 isocyanate-reactive groups and which reacts faster with an isocyanate group than with an isocyanate group blocked with the blocking agent represented by Formula I, provided that
(i) at least 80% by weight, preferably at least 90% by weight, most preferably at least 95% by weight of a) and c) contains at least one cyclic structure and
(ii) the equivalent ratio of the isocyanate groups in a) to the total isocyanate-reactive groups in b) and c) is from about 0.7 to about 1.3, preferably from about 0.9 to about 1.1.

The actual functionality of the blocking agent represented by Formula I is dependent on its reactivity, the reaction conditions and the particular isocyanate(s) and isocyanate-reactive compound(s) c). This is usually higher than one but no greater than two.

As used herein, the term "cyclic structure" means that the compound has at least one aromatic ring (e.g., 2,6-toluene diisocyanate) or cycloaliphatic ring (e.g., 4,4'-diaminodicyclohexylmethane). Compounds with no cyclic structure (e.g., 1,6-hexamethylenediisocyanate (HDI)) can only be used in amounts which total up to 20% by weight of the total weight of polyisocyanate plus polyisocyanate-reactive compounds in a) and c), preferably less than 10% by weight.

Any of the known polyisocyanates having a functionality of at least about two may be used as polyisocyanate a), provided that any polyisocyanate which does not have a cyclic structure must be used in combination with a polyisocyanate that does have a cyclic structure in an amount such that the minimum 80% cyclic structure requirement is satisfied.

Suitable polyisocyanates include any of the known aliphatic, cycloaliphatic, araliphatic and aromatic di- and/or polyisocyanates.

Specific examples of suitable polyisocyanates include: 1,4-tetramethylendiisocyanate; 1,6-hexamethylene-diisocyanate (HDI); 1,8-octamethylenediisocyanate; 1,11-undecane-methylenediisocyanate; 1,12-dodecamethylendiisocyanate; 2,2,4- and 2,4,4-trimethyl-1,6-hexamethylenediisocyanate (TMDI); 1,3- and 1,4-cyclohexane diisocyanate; 1-isocyanato-3-isocyanatomethyl-3,5,5-trimethylcyclohexane (IPDI); 1-isocyanato-1-methyl-4(3)-isocyanatomethylcyclohexane (IMCI); 1,4-phenylenediisocyanate; 1,5-naphthalenediisocyanate; 1-isocyanato-2-isocyanatomethylcyclopentane; (4,4'- and/or 2,4'-) diisocyanato-dicyclohexylmethane (H12-MDI); bis-(4-isocyanato-3-methylcyclohexyl)methane; xylylenediisocyanate (XDI); α,α,α',α'-tetramethyl-1,3- and/or -1,4-xylylenediisocyanate (TMXDI); 1,3- and/or 1,4-hexahydroxylylene-diisocyanate (H6-XDI); 2,4- and/or 2,6-hexahydrotoluene-diisocyanate (H6-TDI); 2,4- and/or 2,6-toluene-diisocyanate (TDI); 4,4'- and/or 2,4'-diphenylmethane-diisocyanate (MDI); n-isopropenyl-dimethylbenzyl-isocyanate (TMI); any double bond containing isocyanate; and any of their derivatives having urethane-, isocyanurate-, allophanate-, biuret-, uretdione-, and/or iminooxadiazindione groups. Mixtures of any of these polyisocyanates may, of course, also be used as long as at least 80% by weight of the total weight of polyisocyanate composition and isocyanate-reactive composition contains the required cyclic structure.

The polyisocyanate a) may also contain urethane groups. Such modified polyisocyanates may be obtained by reacting a polyol with the polyisocyanate. Examples of suitable polyols include: ethylene glycol; 1,2- and 1,3-propanediol; 1,2-butanediol; 1,3-butanediol; 1,4-butanediol; 2,3-butanediol; neopentylglycol; 1,6-hexanediol; 2-methyl-1,3-propanediol; 2,2,4-trimethyl-1,3-pentanediol; 2-n-butyl-2-ethyl-1,3-propanediol; glycerine monoalkanoates (e.g., glycerine monostearates); dimer fatty alcohols; diethylene glycol; triethylene glycol; tetraethylene glycol; 1,4-dimethylolcyclohexane; dodecanediol; bisphenol-A; hydrogenated bisphenol A; 1,3-hexanediol; 1,3-octanediol; 1,3-decanediol; 3-methyl-1,5-pentanediol; 3,3-dimethyl-1,2-butanediol; 2-methyl-1,3-pentanediol; 2-methyl-2,4-pentanediol; 3-hydroxymethyl-4-heptanol; 2-hydroxymethyl-2,3-dimethyl-1-pentanol; glycerine; trimethylol ethane; trimethylol propane; trimerized fatty alcohols; isomeric hexanetriols; sorbitol; pentaerythritol; di- and/or tri-methylolpropane; di-pentaerythritol; diglycerine; 2,3-butenediol; trimethylol propane monoallylether; fumaric and/or maleinic acid containing polyesters; 4,8-bis-(hydroxymethyl)-tricyclo[5,2,0(2,6)]-decane long chain alcohols such as those available under the name Unilin® from Baker Petrolite; and hydroxy functional esters with a number average molecular weight (Mw) of less than 2000, preferably, less than 500. Suitable hydroxy-functional esters may be prepared by the addition of the above-mentioned polyols with ε-caprolactone or reacted in a condensation reaction with an aromatic or aliphatic diacid. These polyols may be reacted with any of the isocyanates described above as being suitable for use as polyi-socyanate a).

Cycloaliphatic diisocyanates such as 1-isocyanato-3-isocyanatomethyl-3,5,5-trimethylcyclohexane (IPDI) and (4,4'- and/or 2,4'-) diisocyanatodicyclohexyl-methane (H12-MDI) are preferably used as polyisocyanate a).

The blocking agent required in the present invention must correspond to Formula I. These compounds may be referred to as "dicarbonylmethanes". These blocking agents may be substoichiometrically deprotonated by Brønsted bases. Such deprotonation may also be catalyzed by Lewis acids. Examples of suitable blocking agents for the production of powder coatings in accordance with the present invention corresponding to Formula I include: malonic acid esters such as diethyl malonate, dimethyl malonate, di(iso)propyl malonate, di(iso)butyl malonate, di(iso)pentyl malonate, di(iso)hexyl malonate, di(iso)heptyl malonate, di(iso)octyl malonate, di(iso)nonyl malonate, di(iso)decyl malonate, alkoxyalkyl malonates, benzylmethyl malonate, di-tert.butyl malonate, ethyl-tert.-butyl malonate, dibenzyl malonate; and acetylacetates such as methyl acetoacetate, ethyl acetoacetate, propyl acetoacetate, butyl acetoacetate and alkoxyalkylacetoacetates; cyanacetates such as cyanacetic acid ethylester; acetylacetone; 2,2-dimethyl-1,3-dioxane-4,6-dione; methyl trimethylsilyl malonate, ethyl trimethylsilyl malonate, and bis(trimethylsilyl) malonate.

Any of the known malonic or alkylmalonic acid esters derived from linear aliphatic, cycloaliphatic, and/or arylalkyl aliphatic alcohols represented by Formula I may also be used. Such esters may be made by alcoholysis using any of the above-mentioned alcohols or any monoalcohol with any of the commercially available esters (e.g., diethylmalonate). For example, diethyl malonate may be reacted with 2-ethylhexanol to obtain the bis-(2-ethylhexyl)-malonate. It is also possible to use mixtures of alcohols to obtain the corresponding mixed malonic or alkylmalonic acid esters.

The alcoholysis can be performed by mixing the alcohol and the malonic or alkylmalonic acid ester(s) and removing (e.g., by distillation) the low boiling alcohol. Any of the common esterification catalysts may be used. Commonly used esterification catalysts include acids (e.g., sulfuric acid, phosphoric acid, di-butyl phosphate, and p-toluenesulfonic acid) and organometallic compounds such as dibutyltin dilaurate and dibutyltin oxide.

It is also possible to react the alcohol with the malonic acid or alkylmalonic acid ester directly without the use of any catalyst. In another method, the blocked isocyanate precursor may be reacted with an alcohol as described, e.g., in U.S. Pat. No. 6,274,693. Under distillation conditions, the alcohol can easily be exchanged.

Suitable alkylmalonic acid esters include: butyl malonic acid di ethylester, diethyl ethyl malonate, diethyl butyl malonate, diethyl isopropyl malonate, diethyl phenol malonate, diethyl n-propyl malonate, diethyl isopropyl malonate, dimethyl allyl malonate, diethyl chloromalonate, and dimethyl chloro-malonate. Mixtures of these esters may also be used. Diethyl malonate and malonate acid esters made with alcohols having a boiling point greater than 100° C. are preferred.

In addition to the required blocking agent corresponding to Formula I, other common blocking agents may also be used in the practice of the present invention. These blocking agents which do not correspond to Formula I, if used, may be used in an amount of from 10 to 500% by weight, based on the weight of the crosslinker(s) corresponding to Formula I. Examples of suitable blocking agents which do not correspond to Formula I include: methylethylketoxime; cyclopentanoneoxime; cyclohexanoneoxime; methyl isobutyl ketoxime; methyl-tert.-butylketoxime; diisopropylketoxime; diisobutylketoxime; acetophenonoxime; N-hydroxyl components such as those present in N-hydroxysuccinimide or hydroxypyridine; lactams such as caprolactam; amines such as diisopropylamine and tert.-butyl benzylamine; heterocyclic components with at least one heteroatom such as mercaptan, piperidine, piperazine, pyrazole (especially 3,5-dimethylpyrazole), imidazole, triazole and tetrazole; α-hydroxybenzoic acid esters; and hydroxam acid esters. Caprolactam, 3,5-dimethylpyrazole and diisopropylamine are preferred optional blocking agents.

Suitable isocyanate-reactive compounds c) include amines and mixtures of amines such as ethylenediamine; 1,2-diaminopropane; 1,4-diaminobutane; 1,6-diaminohexane; 2,5-diamino-2,5-dimethylhexane; 2,2,4- and/or 2,4,4-trimethyl-1,6-diaminohexane; 1,11-diaminoundecane; 1,12-diaminododecane; 1-amino-3,3,5-trimethyl-5-aminomethyl-cyclohexane; 2,4- and/or 2,6-hexahydro-toluenediamine; other alkyl-substituted cyclohexanediamines such as isopropyl-2,4- andlor-2,6-diaminocyclohexane; 2,4'- and/or 4,4'-diaminodicyclohexylmethane; 3,3'-dimethyl-4,4'-diaminodicyclohexylmethane; the isomers of diaminodicyclohexylmethane containing a methyl group as main substituent (e.g., monomethyldiaminodicyclohexylmethane); 3(4)-aminomethyl-1-methylcyclohexylamine and also polyether polyamines having aliphatically bound primary amino groups, such as those available under the Jeffamine trade name from Huntsman, 1-amino-3,3,5-trimethyl-5-aminomethylcyclohexane, 4,4'-diaminodicyclohexyl-methane, 3,3'-dimethyl-4,4'-diaminodicyclohexylmethane, hexahydro-2,4- and/or -2,6-diaminotoluene and the isomers of monomethyldiaminodicyclohexyl-methane and 3(4)-aminomethyl-1-methyl-cyclohexylamine.

The reaction products of maleic or fumaric acid esters with the above-mentioned amines resulting in an aspartate are also useful as an isocyanate-reactive material for the practice of the present invention. The aspartates may be produced from dimethylmaleinate, diethylmaleinate, di-n- or -isopropylmaleinate, i- or n-butylmaleinate, di-2-ethylhexylmaleinate and the corresponding fumaric acid esters with diamines such as 4.4'-diaminodicyclohexylmethane or 3,3'-dimethyl-4,4'-diaminodicyclohexylmethane. The synthesis of these aspartates is described, for example, in EP 0 403 921; EP 0 639 628; EP 0 667 362; EP 0 689 881; and DE 197 17 427.

Aminofunctional or alcohol-functional urethanes and ureas made from the above-mentioned amines and alcohols with polyisocyanate component a) may also be used as isocyanate-reactive component c).

It is preferred that mixtures of the above-mentioned amines be used in order to avoid crystallization. Especially preferred are aspartates, particularly the ones made from 4,4'-diaminodicyclohexylmethane or 3,3'-dimethyl-4,4'-diaminodicyclohexyl-methane with diethylmalonate.

In general, the solid crosslinkers of the present invention may be produced by reacting polyisocyanate component a) with the blocking agent represented by Formula I and then with isocyanate-reactive component c). The crosslinker of the present invention may also be produced by first reacting the polyisocyanate component a) with isocyanate-reactive component c) and subsequently reacting this product with the blocking agent corresponding to Formula I. It is also possible to react polyisocyanate component a) with a first blocking agent corresponding to Formula I, then with isocyanate-reactive component c) and then with more of the same blocking agent corresponding to Formula I, a second blocking agent corresponding to Formula I, a blocking agent which does not correspond to Formula I or a combination of such blocking agents. It is also possible to react the polyisocyanate with a blocking agent that does not correspond to Formula I, then with one or more blocking agent(s) corresponding to Formula I, and then with the isocyanate-reactive component. It is preferred that the polyisocyanate be reacted with the blocking agent corresponding to Formula I and, if used, any optional blocking agent which does not correspond to Formula I in any order or simultaneously before the polyisocyanate is brought into contact with any of isocyanate-reactive component c).

The blocking reaction of polyisocyanate with the blocking agent corresponding to Formula I is catalyzed with a Broensted base and/or Lewis acid. Any of the catalysts commonly used for such reactions are suitable. Examples of suitable catalysts include the alkali metal alcoholates and/or phenolates such as sodium methanolate, potassium methanolate, sodium ethanolate and/or sodium phenolate. These catalysts are commonly used in alcoholic solutions. Metal carboxylates such as zinc(iso)octanoate, potassium ethyl hexanoate, sodium propionate and pure sodium may also be used. Salts of the blocking agent corresponding to Formula I such as sodium dialkylmalonate may also be used. Dilution of the catalyst with some or all of the blocking agent corresponding to Formula I may be advantageous for dosage purposes.

The blocking catalyst may be added all at once at the beginning of the blocking reaction. A significant exotherm may be observed with such single addition. Continuous addition or the addition of catalyst in several portions to the polyisocyanate/blocking agent mixture is also possible. Commonly used amounts of the blocking catalyst are from 0.01–5% by weight based on total weight of the polyisocyanate plus blocking agent, preferably from about 0.05 to about 2% by weight.

The blocking reaction is generally carried out at a temperature of from about 0 to about 120° C., preferably from about 30 to about 80° C. Reaction times vary from 30 minutes to several days depending on temperature, type of catalyst, type of isocyanate and blocking agent.

Preferred reaction times are from 2 to 12 hours. It is also possible to add the catalyst to the polyisocyanate/blocking agent mixture at room temperature and use the exotherm generated after the catalyst addition for heating.

In a continuous process, the blocking reaction may be conducted at much higher temperatures (i.e., up to 250° C.) and much shorter reaction times (i.e., less than 10 minutes). The polyisocyanate and the blocking agent corresponding to Formula I may be reacted in an extruder, kneader, or static mixer. The isocyanate-reactive compound or component may be introduced into the reaction mixture either simultaneously with the polyisocyanate and blocking agent or later. It is preferred that the isocyanate-reactive compound or component be added after the blocking reaction is complete.

The preferred general procedure for producing the crosslinkers of the present invention is reacting the polyisocyanate with the blocking agent corresponding to Formula I at a temperature which is typically from about 25 to about 80° C. The polyisocyanate and blocking agent may be charged to the reaction vessel together and the blocking catalyst may be subsequently added or the blocking catalyst may be dissolved either partially or completely in the blocking agent and then added to the polyisocyanate. The addition of the blocking catalyst (solution) may also be performed continuously. After the isocyanate has been either partially or completely reacted with the blocking agent corresponding to Formula I, isocyanate-reactive component c) is added. It is especially preferred that isocyanate-reactive component c) be added partially or dropwise while the temperature is raised as the viscosity of the mixture increases. Isocyanate-reactive component c) may also be added at constant temperature. The addition reaction of polyisocyanate and isocyanate-reactive component is usually finished after 0.1–5 hours at 100–160°, preferably after 0.5–2 hours at 120–140° C. The product may then be discharged onto an aluminum pan, a cooling belt, etc.

The process of the present invention may be carried out on either a batch or a continuous basis. Static mixers or extruders suitable for reactive extrusion processes may be used.

The new solid, storage stable, friable and grindable solid products obtained by the process of the present invention are valuable crosslinkers for powder coatings. They may be processed in combination with one or more crosslinkers and/or resins as thermally crosslinkable powder clear coatings. They may also preferably be used in combination with any of the additives conventionally used in coatings technology, such as pigments (e.g., titanium dioxide), levelling agents (e.g., polybutyl acrylate or silicones), deaerating agents (e.g., benzoin), tribological additives (e.g., aliphatic amines) and/or other additives. The crosslinkers of the present invention and these other additives may be homogenized, for example, on extruders or kneaders at temperatures within the range of from 30 to 130° C., preferably from 70 to 110° C. It is also possible to add these auxiliary substances and additives to the reaction mixture or resin melt during, at the beginning of or immediately at the end of production of the crosslinker(s) of the present invention.

The solid obtained is then ground in known manner and coarse grain fractions, preferably those having a grain size above 0.1 mm, are removed by screening.

The crosslinkers of the present invention may be used in any of the known powder coating formulations in which an alcohol is present or in which an alcohol is generated during the cure of the coating composition.

The pulverulent coating compositions in which a crosslinker produced in accordance with the present invention is included may be applied to a substrate to be coated using any of the conventional powder application processes, such as electrostatic powder spraying, triboelectric application or fluidized bed coating. The coating is then initially fused by the action of heat (e.g., from an infrared light source) to form a film which is clear, unless a pigment or some other color-producing agent has been incorporated into the coating composition. The temperature necessary to achieve the desired degree of fusion is above 50° C., preferably, above 70° C., more preferably, above 80° C. The coatings may be cured either by heating to a temperature of from above 80 to 220° C., preferably, from 80 to 160° C. in 3–60 minutes, preferably 5–25 minutes.

Powder coatings made with the crosslinkers of the present invention are suitable for coating substrates such as wood, metal, plastics, mineral substances and/or pre-coated substrates made therefrom, or substrates made from or containing any combination of these materials. Applications for which the powder coatings of the present invention are particularly well suited include industrial coating of metallic substrates, composite substrates, and non metallic substrates like medium density fiberboard sheets, pre-assembled high-grade products which already contain temperature-sensitive sub-assemblies (e.g., electronic sub-assemblies), furniture, coils, automotive bodies and parts attached thereto.

The powder coatings made in accordance with the present invention which include one or more of the new solid, storage stable, friable and grindable solid crosslinkers of the present invention may also include one or more conventional resins such as polyesters, polyacrylates, polyethers, polyamides and/or polycarbonates. Combinations in which the curing chemistries are based on alcoholysis, acidolysis, trans)esterification, urethane formation, epoxy/acid or epoxy/amine curing are particularly suitable.

The new solid crosslinkers of the present invention may also be used in combination with other crosslinkers such as isocyanates blocked with one or more blocking agents that do not correspond to Formula I such as, e.g., those which are commercially available under the designations XP-7180, Crelan NI-2, Crelan NW-5, from Bayer Polymers LLC (Pittsburgh, Pa., USA); self-blocked isocyanates such as those which are commercially available under the name Crelan VPLS 2147 from Bayer Polymers LLC (Pittsburgh, Pa. USA); TGIC (Triglycidylisocyanurate); hydroxyalkylamides such as those which are commercially available under the names Primid XL-552 and Primid QM-1260 from Ems-Chemie AG (Switzerland); Tetramethoxymethylglycoluril which is commercially available under the name Powderlink 1174 from Cytec Industries (West Paterson, N.Y., USA); epoxy resins which are commercially available under the names Araldite PT810, Araldite PT910 and Araldite PT912 from Vantico (Brewster, N.Y., USA); epoxides typically based on bisphenol A or other phenols such as those which are commercially available under the designations D.E.R. 661 and D.E.R. 664U from Dow Chemical Company (Midland, Mich., USA); the Epon 1000 or 2000 series which are available from Resolution Performance Products (Pueblo, Colo., USA); glycidyl functional polyacrylates such as that available under the designation FINE-CLAD A-253 from Reichhold (Research Triangle Park, N.C., USA); and/or OH functional polyester resins such as those available under the names Rucote 102 and Rucote 104 from Bayer Polymers LLC (Pittsburgh, Pa., USA); hydroxyl functional acrylates (e.g., Johncryl 587 available from SC Johnson, Stwrtevant, Wis.); acid functional resins such as that which is commercially available under the name Rucote 900 from Bayer Polymers LLC (Pittsburgh, Pa., USA); dual functional/multifunctional polyesters (any combination of acid, alcohol, or epoxy functionality) such as those which are commercially available under the names FINE-CLAD M-8400, M8402, M-8406 and M-8710 from Reichhold (Research Triangle Park, N.C., USA).

The new crosslinkers of the present invention may be used in varying amounts (e.g., amounts of from 0.1 to 30% by weight, based on total weight of the coating components) in standard powder coating formulations (such as TGIC (triglycidylisocyanurate), hybrid, polyurethane and hydroxyalkylamide formulations) to achieve a special appearance such as a textured appearance. The crosslinkers of the present invention may also be used to improve the crosslink density, speed of reaction or to reduce cure temperature (when used, e.g., as a second curative with any of the above-mentioned crosslinkers and/or resins). The low temperature curing reaction can also be used to adjust textures, gloss, viscosity and special flow effect.

The crosslinkers of the present invention may also be used in combination with UV curing resins in powder coatings based on unsaturated polyesters, polyacrylics, vinylurethanes, urethane acrylates, and acryl functional polymers (made, e.g., from epoxy-functional polyesters or polyacrylates with acrylic acid or made from acid functional polyesters or polyacrylates with glycidyl methacrylate). It is therefore possible to use an additional thermal cure in the same temperature range as the first cure temperature range where UV powder coatings are levelled and cured.

Having thus described our invention, the following Examples are given as being illustrative thereof. All parts and percentages given in these Examples are parts by weight or percentages by weight, unless otherwise indicated.

EXAMPLES

The materials used in the Examples were as follows:

ISOCYANATE A: bis-(4-isocyanatocyclohexyl)methane which is commercially available under the name Desmodur W from Bayer Polymers LLC.

ISOCYANATE B: an aliphatic polyisocyanate based on 1,6-hexamethylene diisocyanate with an isocyanurate structure which is commercially available under the name Desmodur N3300 from Bayer Polymers LLC.

ISOCYANATE C: isophorone diisocyanate which is commercially available under the name Desmodur I from Bayer Polymers LLC.

DEM: diethyl malonate.

DIPM: diisopropyl malonate.

DMP: dimethylpyrazole.

CATALYST: 30% solution of sodium methoxide in methanol.

ADDUCT 1: an adduct made from 2 moles of diethylmaleinate and 1 mole of 4.4'-diaminodicyclohexylmethane, which is commercially available under the name Desmophan NH1420 from Bayer Polymers LLC.

ADDUCT 2: an adduct made from 2 moles of diethylmaleinate and 1 mole of 3,3'-dimethyl-4,4'-diaminodicyclohexylmethane which is commercially available under the name Desmophan NH1520 from Bayer Polymers LLC.

Example 1

To a 2 liter reaction flask equipped with a thermocouple, a stirrer and nitrogen inlet were charged 655 g of ISOCYANATE A and 400 g of DEM. With stirring, the temperature was brought to 50° C. 1.06 g of CATALYST were added dropwise to the flask over a period of 30 minutes. The reaction temperature was maintained below 55° C. The NCO content dropped to 10.95% after 6.5 hours. 152.4 g of ADDUCT 1 were then added to the flask and the reaction mixture was heated to 90° C. After 20 minutes, 305 g of ADDUCT 1 were added. After another 25 minutes, another 305 g of ADDUCT 1 were added to the flask while the reaction temperature was maintained at 125° C. After another hour of stirring, the reaction product was discharged onto an aluminum pan. The solid product had an NCO content of 0.8% and a glass transition temperature (Tg) of 47° C.

Example 2

To a 2 liter reaction flask equipped with a thermocouple, a stirrer and nitrogen inlet were charged 634.04 g of ISOCYANATE A and 352 g of DEM. With stirring, the temperature was brought to 60° C. 0.986 g of CATALYST were then added. The reaction temperature was not allowed to exceed 71° C. After 7 hours, the NCO content had dropped to 12.55%. The reaction mixture was then heated to 90° C. and 163.31 g of ADDUCT 1 were then added. After 35 minutes, another 326.63 g of ADDUCT 1 were added and the temperature was adjusted to 110° C. After another 50 minutes, another 326.63 g of ADDUCT 1 were added while the reaction temperature was maintained at 130° C. After 80 minutes, the reaction product was discharged onto an aluminum pan. The solid product had an NCO content of 0.84% and a glass transition temperature (Tg) of 58° C.

Example 3

To a 500 ml reaction flask equipped with a thermocouple, a stirrer and nitrogen inlet were charged 131 g of ISOCYANATE A. With stirring, the temperature was brought to 120° C. 6.2 g of ethylene glycol were added dropwise and stirred for 1 hour. The reaction mixture was cooled to 60° C. and 80 g of DEM were added. 0.22 g of CATALYST were added to the flask dropwise over a period of 20 minutes. The reaction temperature was kept below 60° C. The NCO content dropped to 7.68% after three hours. 22 g of ADDUCT 1 were then added and the reaction vessel contents were heated to 90° C. After 20 minutes, 44 g of ADDUCT 1 were added. After another 40 minutes, another 44.12 g of ADDUCT 1 were added while the reaction temperature was maintained at 130° C. After two hours with stirring, the reaction product was discharged onto an aluminum pan. The solid product had an NCO content of 0.52% and a glass transition temperature (Tg) of 42° C.

Example 4

To a 500 ml reaction flask equipped with a thermocouple, a stirrer and nitrogen inlet were charged 117.9 g of ISOCYANATE A, 8.4 g of ISOCYANATE B and 80 g of DEM and heated to 60° C. 0.22 g of CATALYST were then added to the flask dropwise over a period of 20 minutes. The reaction temperature was kept below 60° C. The NCO content dropped to 6.5% after three hours. 17.7 g of ADDUCT 1 were then added to the flask and the reaction mixture was heated to 90° C. After 20 minutes, 35.4 g of ADDUCT 1 were added to the flask. After another 40 minutes, another 35.4 g of ADDUCT 1 were added while the reaction temperature was maintained at 130° C. After 1.75 hours with stirring, the reaction product was discharged onto an aluminum pan. The solid product had an NCO content of 0.59% and a glass transition temperature (Tg) of 32° C.

Example 5

To a 2 liter reaction flask equipped with a thermocouple, a stirrer and nitrogen inlet were charged 314.4 g of ISOCYANATE A and 225.6 g of DIPM. With stirring, the temperature was brought to 60° C. 0.506 g of CATALYST were added to the flask over a period of 15 minutes. The reaction temperature was kept below 60° C. When the NCO content had dropped to 10.33%, 73.62 g ADDUCT 1 were added to the flask and the reaction mixture was heated to 90° C. After 45 minutes, 147.22 g of ADDUCT 1 were added and the temperature was brought to 110° C. After another 30 minutes, another 147.22 g of ADDUCT 1 were added while the reaction temperature was maintained at 130° C. After 160 minutes with stirring, the reaction product was discharged onto an aluminum pan. The solid product had an NCO content of 0.85% and a glass transition temperature (Tg) of 49° C.

Example 6

To a 2 liter reaction flask equipped with a thermocouple, a stirrer and nitrogen inlet were charged 785.21 g of ISOCYANATE C and 252.27 g of DEM. With stirring, the temperature was brought to 30° C. A mixture of 1.764 g of CATALYST and 28.03 g of DEM were added over a period of 15 minutes. The reaction temperature was maintained at 30° C. After 43.5 hours, the NCO content had dropped to 15.7%. The temperature was brought to 70° C., 367.3 g of ADDUCT 1 were added and the reaction mixture was heated to 90° C. After 10 minutes, another 367.3 g of ADDUCT 1 were added and the temperature was brought to 110° C. After another 10 minutes, an additional 367.3 g of ADDUCT 1 were added while the reaction temperature was maintained at 160° C. After another 90 minutes with stirring, the reaction product was discharged onto an aluminum pan. The solid product had an NCO-content of 1.0% and a Tg of 85° C.

Example 7

To a 2 liter reaction flask equipped with a thermocouple, a stirrer and nitrogen inlet were charged 1078 g of ISOCY- ANATE A. The contents of the flask were then heated to 60° C. 448 g of DEM and 1.76 g of CATALYST were then added to the flask. The NCO content dropped to 14.40% after 230 minutes. 115.2 g of DMP were added and the contents of the flask were heated to 70° C. After an additional 90 minutes, the NCO content dropped to 9.68%. 514.63 g of ADDUCT 1 were then added to the flask and the reaction mixture was heated to 110° C. After 10 minutes, another 514.63 g of ADDUCT 1 were added. After an additional 1.5 hours with stirring, the reaction product was discharged onto an aluminum pan. The solid product had a NCO content of 0.32% and a glass transition temperature of 40° C.

Example 8

To a two liter reaction flask equipped with a thermocouple, a stirrer and nitrogen inlet were charged 791.94 g of ISOCYANATE A and 479.37 g of DEM. The contents of the flask were then brought to 80° C. 1.32 g of CATALYST and 47.94 g of DEM were then added to the flask over a period of 45 minutes. A maximum exotherm of up to 93° C. was observed. The mixture was then stirred for 21 hours. The NCO content dropped to 8.95%.

To a second 2 liter reaction flask equipped with a thermocouple, a stirrer and nitrogen inlet, 471.08 g of the above-described product were charged and heated to 100° C. 290 g of ADDUCT 2 were then added over a period of one hour. After 2.5 hours with stirring, the solid product had an NCO content of 3.52%. The glass transition temperature was 52° C. and the NCO content was 1.82%.

Example 9

To a 2 liter flask equipped with a thermocouple, a stirrer and a nitrogen inlet were charged 320 g of DEM, 520 g of 2-ethylhexanol and 0.84 g of sulfuric acid. The contents of the flask were then brought to a temperature of 150° C. Ethanol was distilled off over a period of 17 hours. The temperature was then gradually raised to 175° C. over a period of 2 hours and more ethanol was distilled off. A total of 154 g of distillate were obtained. The temperature of the flask contents was then reduced to 150° and vacuum was applied to distill an additional 209 g of volatile material. 464 g of product were obtained.

To a second 2 liter reaction flask equipped with a thermocouple, a stirrer and a nitrogen inlet were charged 452 g of ISOCYANATE A and 311 g of the above-described product. With stirring, the temperature of the flask contents was brought to 70° C. 1.68 g of CATALYST were then added dropwise to the flask over a period of 10 minutes. The reaction temperature was kept below 75° C. The NCO content of dropped to 12.65% after 6.7 hours. 127.53 g of ADDUCT 1 were then added to the flask and the flask contents were heated to 90° C. After 10 minutes, 255.07 g of ADDUCT 1 were added and the temperature was maintained at 110° C. After another 8 minutes, an additional 255.07 g of ADDUCT 1 were added to the flask and the temperature was maintained at 130° C. After further reaction with stirring for an additional 70 minutes, the reaction product was discharged onto an aluminum pan. The solid product had an NCO content of 0.5% and a glass transition temperature of 50° C.

Example 10

The product from Example 1 was evaluated as the sole crosslinker in a standard urethane-based powder coating. The coating formulation and processing conditions are shown in Table 1 below.

TABLE 1

| Component | Product | Sample A | Sample B |
|---|---|---|---|
| Black Coating Formulation | | | |
| Polyester | Rucote 102[1] | 666.76 g | 600.08 g |
| | Rucoflex S-1072-30[1] | | 66.68 g |
| Crosslinker | Example 1 | 285.75 g | 285.75 g |
| Flow Modifier | Modarez MFP-G[2] | 15.00 g | 15.00 g |
| Degassing Agent | Oxymelt A4[3] | 7.50 g | 7.50 g |
| Pigment | Carbon Black[4] | 25.00 g | 25.00 g |
| Total weight | | 1000.01 g | 1000.01 g |
| Mixing | | Hand mix | Hand mix |
| Extrusion Conditions | | Double Pass | Double Pass |
| Extruder | | Prism | Prism |
| Temp 1 | | 50° C. | 50° C. |
| Temp 2 | | 70° C. | 70° C. |
| Rpm | | 400 | 400 |
| Torque | | 60–80 | 60–80 |

[1]Rucote 102 and Rucoflex S-1072-30 are polyesters available from Bayer Polymers LLC, Pittsburgh, PA USA.
[2]Modarez MFP-G is a flow modifier available from Synthron, Inc. Morganton, NC, USA.
[3]Oxymelt A4 is a degassing agent available from Estron Chemical; Calvert City, KY, USA.
[4]Carbon Black (Raven 1255) is available from Columbian Chemicals Company Marietta, GA USA.

Each of the powder coatings described in Table 1 was extruded at the temperatures indicated in that Table, processed, sieved and electrostatically sprayed onto standard aluminum and steel panels. Each of the coatings passed 50 double rubs of a MEK (methyl ethyl ketone) soaked cotton pad ("MEK Double Rubs") when cured at 120° C./30 mins. When a semi-crystalline resin such as Rucoflex S-1072-30 polyester was used, improved coatings flow and leveling were found.

Example 11

The product from Example 1 was evaluated as one of two crosslinkers in the low-temperature TGIC cure formulations described in Table 2 below.

TABLE 2

| Component | Product | Sample A | Sample B | Sample C | Sample D |
|---|---|---|---|---|---|
| Black Formulation | | | | | |
| Polyester | R921[5] (g) | 885.83 | 885.83 | | |
| | R911[5] (g) | | | 885.83 | 885.83 |
| Crosslinker | TGIC (g) | 66.68 | 66.68 | 66.68 | 66.68 |
| | Example 1 (g) | 44.29 | | 44.29 | |
| Flow Modifier | Modarez MFP-G[2] (g) | 15.00 | 15.00 | 15.00 | 15.00 |
| Degassing Agent | Oxymelt A4[3] (g) | 7.50 | 7.50 | 7.50 | 7.50 |
| Pigment | Carbon Black[4] (g) | 25.00 | 25.00 | 25.00 | 25.00 |
| Total weight (g) | | 1044.3 | 1000 | 1044.3 | 1000 |
| Mixing | | Hand mix | Hand mix | Hand mix | Hand mix |
| Extrusion Conditions | | Double Pass | Double Pass | Double Pass | Double Pass |
| Extruder | | Prism | Prism | Prism | Prism |
| Temp 1 | | 50° C. | 50° C. | 50° C. | 50° C. |
| Temp 2 | | 70° C. | 70° C. | 70° C. | 70° C. |
| Rpm | | 400 | 400 | 400 | 400 |
| Torque | | 60–80 | 60–80 | 60–80 | 60–80 |

[2,3,4]Same as Table 1.
[5]R911 = Rucote 911 and R921 = Rucote 921 are available from Bayer Polymers LLC, Pittsburgh, PA USA.

The properties of coatings made with and without the solid, blocked isocyanate crosslinker of the present invention as the second crosslinker are shown in Table 3 below.

TABLE 3

| Black Formulation | | Solvent Resistance - MEK Double Rubs | | | |
|---|---|---|---|---|---|
| Cure Temp, ° C. | Cure Time, min. | Sample A | Sample B | Sample C | Sample D |
| 140 | 15 | 100 | 40 | 70 | 30 |
| 140 | 20 | NA | NA | 100 | 57 |
| 130 | 15 | 100 | 28 | NA | NA |

NA = not applicable.

The solvent resistance data demonstrates that the DEM-blocked isocyanate crosslinker of the present invention reacts with the hydroxyl groups present in the polyester chain thereby improving the crosslink density. The crosslinker of the present invention can therefore be used as a fortifying agent in standard polyester powder coating formulations and to lower the cure window for such coatings.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A solid isocyanate-based composition which is at least partially blocked with at least one compound corresponding to the formula

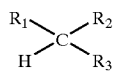

in which
 $R_1$ represents hydrogen, an alkyl group, an aryl group, halogen or an allyl group,
 $R_2$ represents a CO—O-alkyl, CO—O-aryl, CO—O-alkoxyalkyl, CO—O-arylalkyl, CO-alkyl, CO-aryl, CO-alkoxyalkyl, CO-arylalkyl, cyanide, Si(CH$_3$)$_3$ or Si(C$_2$H$_5$)$_3$ group,
 $R_3$ represents the same group as $R_2$ or a different CO—O-alkyl, CO—O-aryl, CO—O-alkoxyalkyl, CO—O-arylalkyl, CO-alkyl, CO-aryl, CO-alkoxyalkyl, CO-arylalkyl, cyanide, Si(CH$_3$)$_3$ or Si(C$_2$H$_5$)$_3$ group, or
 $R_2$ and $R_3$ together represent a cyclic ketone and/or ester having a glass transition temperature of at least 32° C.

2. A solid isocyanate-based composition which is at least partially blocked with at least one compound corresponding to the formula
in which
 $R_1$ represents hydrogen, an alkyl group, an aryl group, halogen or an allyl group,
 $R_2$ represents a CO—O-alkyl, CO—O-aryl, CO—O-alkoxyalkyl, CO—O-arylalkyl, CO-alkyl, CO-aryl, CO-alkoxyalkyl, CO-arylalkyl, cyanide, Si(CH$_3$)$_3$ or Si(C$_2$H$_3$)$_5$ group,
 $R_3$ represents the same group as $R_2$ or a different CO—O-alkyl, CO—O-aryl, CO—O-alkoxyalkyl, CO—O-arylalkyl, CO-alkyl, CO-aryl, CO-alkoxyalkyl, CO-arylalkyl, cyanide, Si(CH$_3$)$_3$ or Si(C$_2$H$_5$)$_3$ group, or
 $R_2$ and $R_3$ together represent a cyclic ketone and/or ester having a glass transition temperature of at least 30° C.;

wherein the composition is the reaction product of
- a) a polyisocyanate or isocyanate-terminated prepolymer component,
- b) a blocking agent comprising at least one compound corresponding to Formula I and, optionally, a blocking agent which does not correspond to Formula I, and
- c) at least one isocyanate-reactive compound that reacts faster with an isocyanate than with an isocyanate blocked with a compound corresponding to Formula I wherein
  - (1) at least 80% by weight of a) and c) has a cyclic structure and
  - (2) the reaction components were used in an equivalent ratio of isocyanate groups in a) to total equivalents of isocyanate reactive groups in b) and c) of from 0.7 to 1.3.

3. The composition of claim 1 in which a) is 1-isocyanato-3-isocyanatomethyl-3,5,5-trimethylcyclohexane and/or (4,4- and/or 2,4'-) diisocyanato-dicyclohexyl-methane.

4. The composition of claim 2 in which b) is diethylmalonate, diisopropyl malonate, dioctyl malonate or a mixture thereof.

5. The composition of claim 2 in which c) is an aspartate produced from (i) 4,4-diaminodicyclohexylmethane or 3,3'-dimethyl-4,4-diaminodicyclohexylmethane and (ii) diethyl maleinate and/or diisopropyl maleinate.

6. A process for the production of the composition of claim 1 comprising
  - I. reacting
    - (a) a polyisocyanate or isocyanate-terminated prepolymer with
    - (b) a blocking agent corresponding to Formula I to form an at least partially blocked polyisocyanate, and then
  - II. reacting the partially blocked polyisocyanate with an isocyanate-reactive compound that reacts faster with an isocyanate group than with an isocyanate group blocked by b).

7. The process of claim 6 in which step b) is carried out in an extruder, kneader, static mixer or batch reactor.

8. The process of claim 6 which is carried out on a continuous basis.

9. The process of claim 6 which is carried out on a batch basis.

10. A powder coating composition which includes the composition of claim 1.

11. The powder coating composition of claim 10 further comprising an amorphous crystalline or semi-crystalline resin selected from the group consisting of polyesters, polyacrylates, polycarbonates, polyurethanes and mixtures thereof.

12. The powder coating of claim 10 further comprising at least one crosslinking agent having one or more epoxy groups, hydroxyalkylamide groups, acid groups.

13. The powder coating of claim 10 further comprising an isocyanate blocked with a blocking agent which does not correspond to Formula I.

14. The powder coating of claim 10 further comprising an ultraviolet-curable compound having at least one acryl, maleinyl, fumaryl, allyl, vinyl or other unsaturated group.

15. A process for the production of a powder coated surface having a textured or glossy appearance comprising coating a substrate with the powder coating of claim 10 and curing the coated substrate at a temperature of from about 80 to about 220° C.

16. A process for adjusting the flow and/or levelling characteristics of a powder coated surface comprising including the composition of claim 1 in the powder coating composition.

17. A coated substrate produced with the powder coating of claim 10.

* * * * *